United States Patent [19]

Chandler

[11] Patent Number: 4,602,816
[45] Date of Patent: Jul. 29, 1986

[54] MOTOR VEHICLE SLING SEAT

[75] Inventor: Maurice P. Chandler, Utica, Mich.

[73] Assignee: General Motors Corporation, Detroit, Mich.

[21] Appl. No.: 646,969

[22] Filed: Sep. 4, 1984

[51] Int. Cl.$^4$ .............................................. B60N 1/00
[52] U.S. Cl. ...................................... 296/63; 297/14; 297/19; 297/457; 5/118
[58] Field of Search ...................... 297/14, 16, 19, 45, 297/47, 350, 351, 457; 296/63, 65 R; 5/118

[56] References Cited

U.S. PATENT DOCUMENTS

| | | | |
|---|---|---|---|
| 280,004 | 6/1883 | Bakewell | 297/457 X |
| 322,354 | 7/1885 | Davey | 297/457 X |
| 795,188 | 7/1905 | Barratt | 297/19 X |
| 1,312,774 | 8/1919 | Barrett | 297/351 |
| 1,625,515 | 4/1927 | Bailey . | |
| 2,127,710 | 8/1938 | Baker | 297/457 |
| 2,348,217 | 5/1944 | Jones . | |
| 2,556,076 | 6/1951 | Evans et al. | 297/457 X |
| 2,601,488 | 6/1952 | Allen . | |
| 2,742,651 | 4/1956 | Ward . | |
| 2,829,702 | 4/1958 | Keating | 297/457 X |
| 2,886,831 | 5/1959 | Duner . | |
| 3,037,216 | 6/1962 | Stringer . | |
| 3,279,846 | 10/1966 | Morosini | 297/19 |
| 3,695,706 | 10/1972 | Basher et al. | 297/457 X |
| 3,868,143 | 2/1975 | Reilly | 297/457 X |
| 4,277,097 | 7/1981 | LaLanne . | |

FOREIGN PATENT DOCUMENTS

| | | |
|---|---|---|
| 1932664 | 1/1971 | Fed. Rep. of Germany . |
| 3107227 | 2/1981 | Fed. Rep. of Germany . |
| 1387901 | 12/1964 | France . |
| 1584167 | 11/1969 | France . |
| 2076481 | 9/1971 | France . |
| 2109699 | 5/1972 | France . |
| 175742 | 2/1922 | United Kingdom ............... 297/457 |
| 1544139 | 4/1979 | United Kingdom ............... 297/16 |

Primary Examiner—William E. Lyddane
Assistant Examiner—Laurie K. Cranmer
Attorney, Agent, or Firm—Charles E. Leahy

[57] ABSTRACT

A sling seat is defined by a flexible quadrilateral sheet panel which is defined by longitudinal side rails of substantially inelastic material connected by a crossband structure of elastic material extending between the side rails. One end of the flexible sheet panel is mounted on a vertical wall of the vehicle body compartment, preferably by a reel for winding the flexible sheet panel to a stored position. The other end of the flexible sheet panel carries hooks which engage a receptacle in a vehicle floor so that the sheet material is erected in a taut condition extending angularly between the floor and the vertical wall. The crossband structure is preferably divided into an upper crossband structure and a lower crossband structure with a space therebetween so that the seating of an occupant against the flexible sheet panel causes the upper crossband structure to yield to a more vertical seat back defining position and the lower crossband structure to yield to a more horizontal seat bottom defining position. The sling may be alternatively deployed at a horizontal orientation to define a bed or a cargo concealment panel by connecting the hooks at the end of the flexible sheet material with a receptacle provided in the opposite vertical wall of the occupant compartment.

1 Claim, 2 Drawing Figures

MOTOR VEHICLE SLING SEAT

The invention relates to a seating structure for a vehicle body and more particularly provides a sling of sheet material which is extended between the wall and floor for nestling an occupant in a seated position.

BACKGROUND OF THE INVENTION

It is well known in lawn furniture such as hammocks and chairs to provide a chair or a bed by slinging a flexible sheet material between two fixed points.

Furthermore, it is known that a bed can be erected in a vehicle body by slinging a flexible sheet material horizontally between fixed supports. It is also known in vehicle bodies to sling a flexible sheet material horizontally between a retracting reel and a retainer to define a cargo concealment panel.

SUMMARY OF THE INVENTION

The present invention provides a new and improved sling structure for a vehicle body and more particularly provides an improved sling structure for defining an occupant seat or alternatively deployable to define a bed or a cargo concealment panel.

According to the invention a sling is defined by a flexible quadrilateral sheet panel which is defined by longitudinal side rails of substantially inelastic material connected by a crossband structure of elastic material extending between the side rails. One end of the flexible sheet panel is mounted on a vertical wall of the vehicle body compartment, preferably by a reel mechanism for winding the flexible sheet panel to a stored position. The other end of the flexible sheet panel carries hooks which engage a receptacle in a vehicle floor so that the sheet material is erected in a taut condition extending angularly between the floor and the vertical wall. The crossband structure is preferably divided into an upper crossband structure and a lower crossband structure with a space therebetween so that the seating of an occupant against the flexible sheet panel causes the upper crossband structure to yield to a more vertical seat back defining position and the lower crossband structure to yield to a more horizontal seat bottom defining position. The sling may be alternatively deployed at a horizontal orientation to define a bed or a cargo concealment panel by connecting the hooks at the end of the flexible sheet material with a receptacle provided in the opposite vertical wall of the occupant compartment.

Accordingly, the object, feature and advantage of the invention resides in the provision of a sling seat structure defined by substantially inelastic side rails stretched taut between a vehicle vertical wall and a floor and connected by a crossband structure of elastic material extending between the side rails and yieldable under the occupant weight to define a seating depression in which the occupant is nestled.

A further object, feature and advantage of the invention resides in the provision of a sling seat comprising a flexible sheet panel wound by a storage reel mounted on a vertical wall in the vehicle and comprising substantially inelastic longitudinal side rails connected by an elastic crossband structure which yields under imposition of occupant weight to define a seating depression in which the occupant is nestled.

A still further object, feature and advantage of the invention resides in the provision of a flexible sheet material alternately deployable between an angled position extending between a vehicle wall and a vehicle floor to define an occupant sling seat and a horizontal position extending taut between the spaced apart vertical walls of the vehicle body to define a bed or a panel concealing cargo stored beneath the horizontally extending sling.

DESCRIPTION OF THE DRAWINGS

Further objects, advantages and features of the invention will become apparent upon consideration of the specification and the appended drawings in which.

DESCRIPTION OF THE PREFERRED EMBOIDMENT

Figure 1:
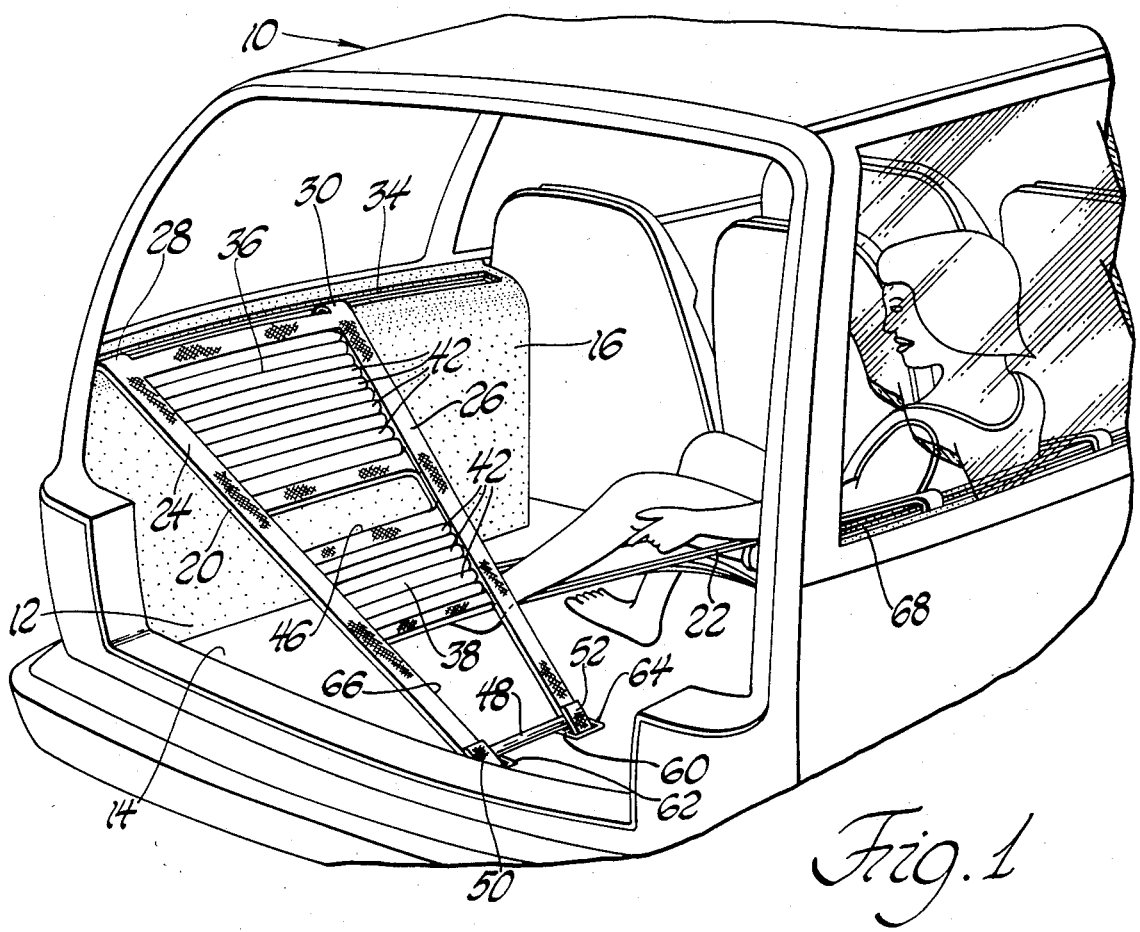
FIG. 1 is a perspective view of a station wagon vehicle body with a pair of sling seats according to the invention deployed for occupant seating.

Referring to FIG. 1 there is shown a station wagon vehicle 10 having a cargo compartment 12 defined by a floor 14 and spaced apart vertical walls 16 and 18. A pair of sling seats 20 and 22 are provided in the cargo compartment 12 and face toward one another. The sling seat 20 includes a pair of spaced apart longitudinally extending side rails 24 and 26 comprised of a flexible substantially inelastic sheet material such as a canvas strap. The upper end 28 of the side rail 24 and the upper end 30 of the side rail 26 extend through a slot 34 at the top of the vertical side wall 16 and are suitably attached to a storage reel 32 which is adapted to wind up the side rails 24 and 26.

The sling seat 20 also includes an upper crossband structure 36 and a lower crossband structure 38 which extend between the side rails 24 and 26. Each of the crossband structures 36 and 38 is defined by an elastic sheet material and preferably comprises such an elastic sheet material such as rubber which is filled with strips of foam and sewn to define a plurality of cushion segments 42. The upper crossband structure 36 and the lower crossband structure 38 are spaced apart somewhat to define an opening 46 therebetween.

The lower ends of the side rails 24 and 26 are suitably attached to a cross bar 48 which establishes and maintains the desired spacing between the side rails 24 and 26. Hooks 50 and 52 are suitably attached to the cross bar 48 or to the ends of the side rails 24 and 26. The hooks 50 and 52 are adapted to engage respectively with anchor pins 58 and 60 mounted within floor receptacles 62 and 64.

Figure 2:
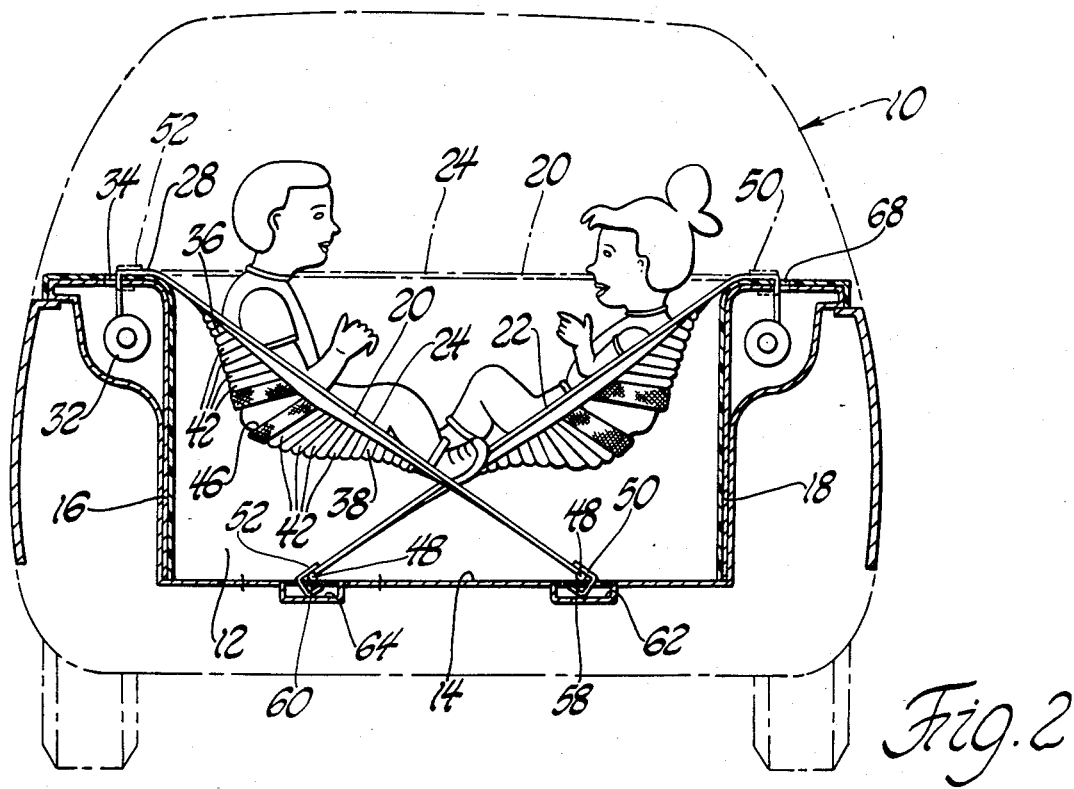
FIG. 2 is a rear elevation view of the vehicle body showing the sling seats deployed for seating use and showing in phantom line the deployment of the sling seats to define a horizontal bed or cargo concealment panel.

As best seen in FIG. 2, the relationship between the mounting of the upper ends of the side rails 24 and 26 on the vertical wall 16 and the mounting of the lower end of the side rails on the floor 14 is such that the side rails 24 and 26 extend angularly between the wall and the floor at an angle of somewhere between 30 and 60 degrees. Furthermore, it is seen that the imposition of the occupant's weight against the sling seat 20 causes the upper crossband structure 36 to yield to a more vertical position relative to the taut side rail straps 24 and 26 and thereby define a seat back. Simultaneously the lower crossband structure 38 yields to a more horizontal position relative the side rails 24 and 26 to define a seat bottom structure. This separate yielding action of the upper and lower crossband structures is facilitated by the presence of the opening 46 provided therebetween. The lower crossband structure 38 is spaced from the cross bar 48 so that a space 66 is defined therebetween to provide a foot space.

When the occupant weight is relieved from the sling seat 20, the upper and lower crossband structures 36 and 38 elastically return to their taut conditions of FIG. 1 so that the generally planar shape of the sling seat is restored. Accordingly, when the hooks 50 and 52 are disengaged from the floor anchor pins 58 and 60, the reel 32 may be energized by a winding spring or a winding crank to wind the sling seat 20 to a stored position upon the reel.

As best seen in FIG. 2, the sling seat 20 may be alternatively deployed to a phantom line indicated horizontal position shown in FIG. 2 by hooking the hooks 50 and 52 into the slot 68 provided at the top of the vertical wall 18. Thus the sling seat is deployed horizontally to provide a bed for a vehicle occupant or to define a concealment panel which conceals any luggage stowed on the vehicle floor 14 beneath the sling seat 20.

Thus it is seen that the invention provides a new and improved sling seat structure which can be alternatively deployed to define an occupant bed or a cargo concealment panel.

The embodiments of the invention in which an exclusive property or privilege is claimed are defined as follows:

1. In a motor vehicle having spaced apart first and second vertical walls and a floor cooperating to define a space, the combination comprising:
   a flexible quadrilateral sheet panel defined by first and second longitudinal extending side rails of flexible and substantially inelastic material and first and second crossband structures of elastic material extending between the side rails in spaced apart relation defining therebetween an opening which divides the flexible sheet panel into a seat back forming upper portion and a seat bottom forming lower portion;
   reel means including a reel mounted on the first vertical wall and adapted to wind up the flexible sheet panel to a stored position whereby the vehicle space presents an unobstructed luggage receiving compartment;
   detachable first and second hook means attached to the first and second side rails of the sheet panel;
   a first pair of receptacle slot means mounted on the vehicle floor in spaced relation from the first vertical wall and adapted for engagement by the hook means when the sheet panel is unwound from the reel to thereby extend the sheet panel taut between the floor and the first vertical wall at an angle of approximately 30°–60°, said first and second elastic crossband structures yielding relative to one another and to the side rails upon seating of an occupant thereagainst whereby the seat back forming upper portion of the flexible sheet panel yields to a more vertical seat back forming position and the seat bottom forming lower portion yields to a more horizontal seat bottom forming position so that a seating depression for nestling the occupant is provided within the flexible quadrilateral sheet panel extending angularly between the wall and the floor thereby defining the vehicle space as an occupant passenger compartment; and
   a second receptacle means mounted on the second vertical wall of the compartment and adapted for engagement by the detachable first and second hook means upon unwinding of the sheet panel from the reel whereby the flexible sheet panel extends horizontally between the first and second vertical walls and above the floor to selectively and alternatively define an occupant bed and simultaneously conceal the luggage compartment space.

* * * * *